(No Model.) 2 Sheets—Sheet 1.
A. W. LIVINGSTON.
CAN SOLDERING MACHINE.
No. 492,034. Patented Feb. 21, 1893.
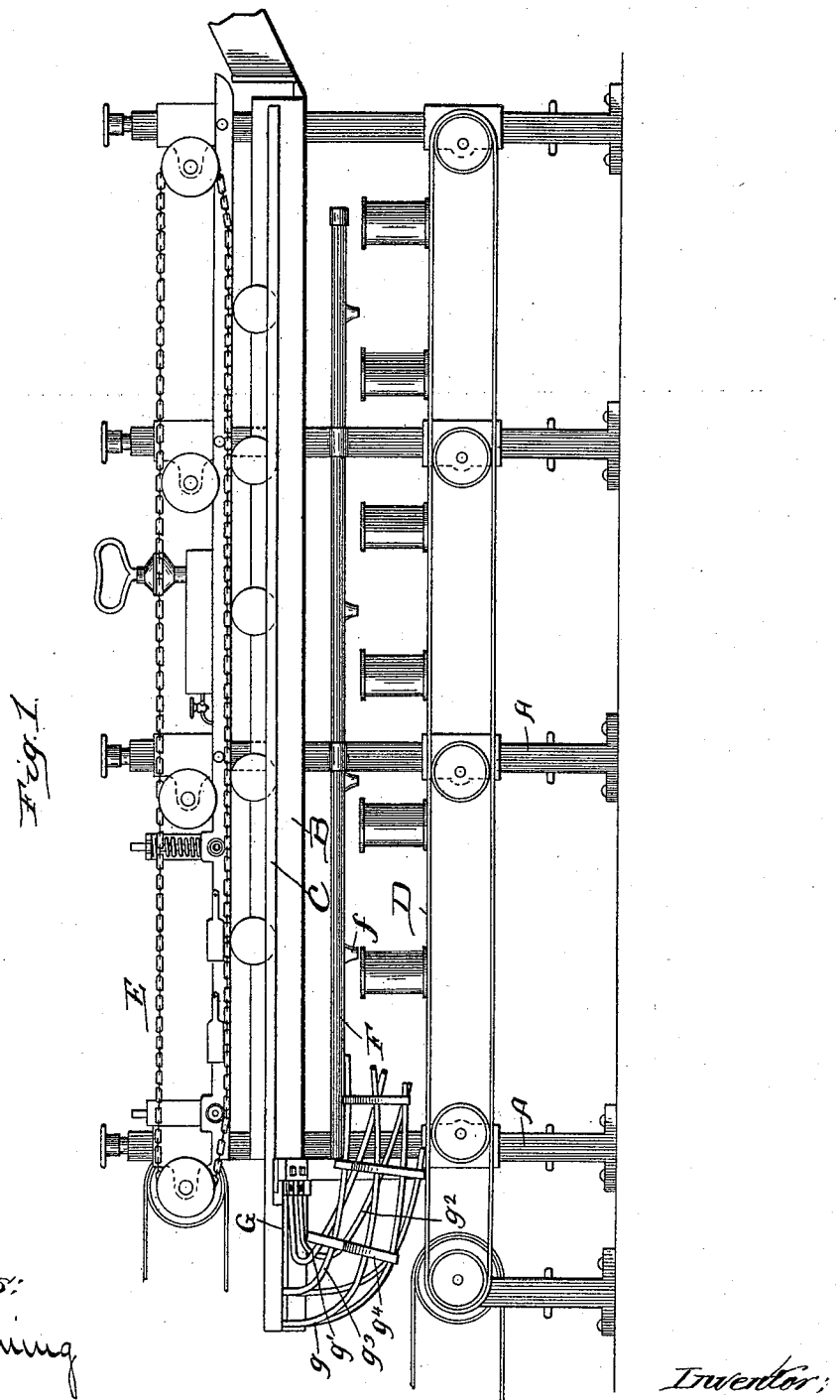

(No Model.) 2 Sheets—Sheet 2.
A. W. LIVINGSTON.
CAN SOLDERING MACHINE.
No. 492,034. Patented Feb. 21, 1893.
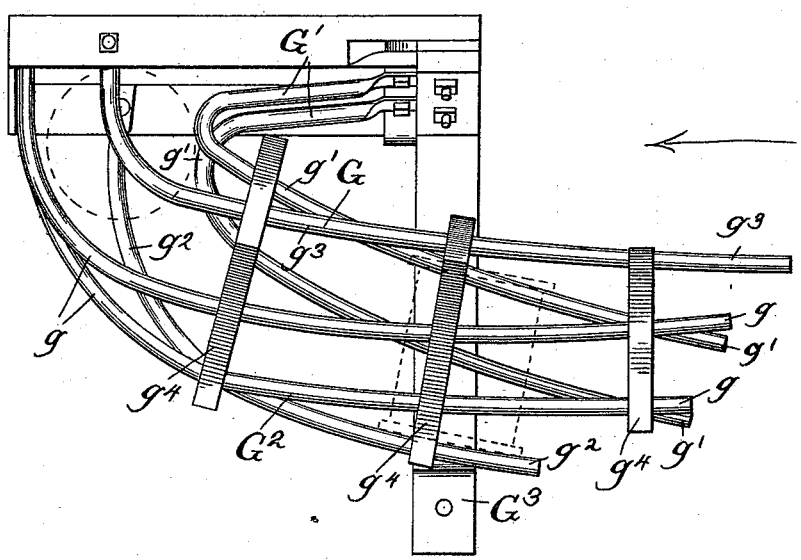
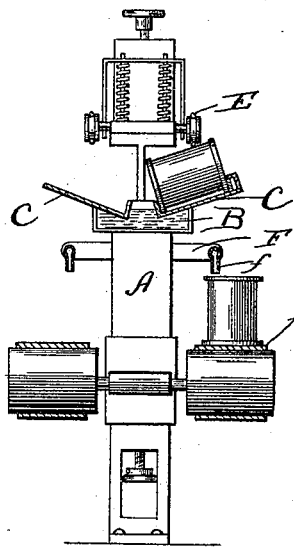
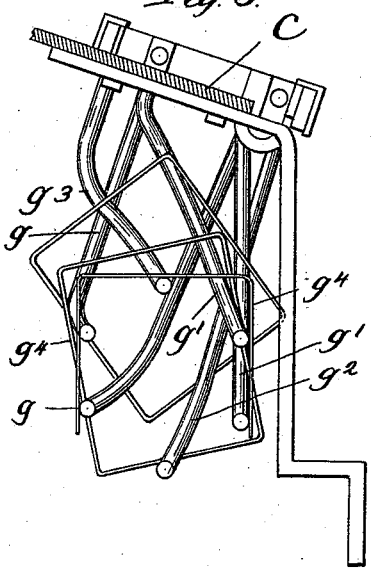

UNITED STATES PATENT OFFICE.

ANDREW WILLIAM LIVINGSTON, OF SAN FRANCISCO, CALIFORNIA, ASSIGNOR TO EDWIN NORTON, OF MAYWOOD, AND OLIVER W. NORTON, OF CHICAGO, ILLINOIS.

CAN-SOLDERING MACHINE.

SPECIFICATION forming part of Letters Patent No. 492,034, dated February 21, 1893.

Application filed August 4, 1892. Serial No. 442,126. (No model.)

*To all whom it may concern:*

Be it known that I, ANDREW WILLIAM LIVINGSTON, a citizen of the United States, residing at San Francisco, in the county of San Francisco and State of California, have invented a new and useful Improvement in Can-Soldering Machines, of which the following is a specification.

My invention relates to improvements in machines for soldering the seams of sheet metal cans, and more particularly to improvements in machines for soldering the end seams of sheet metal cans by rolling the cans in a somewhat inclined position through or over a bath of molten solder, or equivalent soldering devices. In machines for soldering the end seams of cans it is most important that after the can has been rolled through the soldering bath it should be turned into an upright or vertical position while the solder is cooling or setting to prevent the solder from running or accumulating at one part of the seam more than another. And machines of this class have generally been provided with a belt or other carrier for conveying the cans in a vertical position after they have been subjected to the solder bath, and for turning the cans from their inclined position to a vertical one. Machines of this class heretofore in use have generally been constructed under and in accordance with Letters Patent of the United States Nos. 232,409, 233,688, 274,363 and 385,775. In machines constructed under these patents the can in passing from the inclined soldering track to the cooling belt or carrier below, has in part a straight vertical path, and while passing through this vertical portion of its path the can of course is moving neither backward nor forward, but is brought to a stand still in respect to its forward movement on the soldering track and in respect to its movement on the cooling belt or carrier. In these machines therefore it is necessary that a considerable space should be allowed between the contiguous cans in the machine in order to give the requisite time for the cans to get out of the way of each other in passing along this vertical intermediate portion of their path; and this materially diminishes what otherwise might be the capacity of the machine.

It is the object of my invention or improvement to provide such soldering machines with means whereby the cans may be rolled closer together and thus materially increase the capacity of the machine, while at the same time the cans are delivered from the inclined soldering track in a vertical position on the cooling belt without stopping their forward motion or momentum and without subjecting the cans to any jarring action, which latter is injurious and liable to produce leaks if it occurs before the solder becomes set.

To this end my invention consists in connection with the inclined soldering track and cooling belt, of a device interposed between the two for changing the direction of movement of the can from the direction of the soldering track to the direction of the cooling belt without stopping the motion or movement of the can and for simultaneously turning the can from its rolling or inclined position into a vertical position for cooling. This device preferably consists of a curved or looped and spirally twisted track; one branch, limb or end of the loop uniting with and forming a continuation of the soldering track, so as to receive the can from the soldering track; and the other branch or limb of the looped and twisted track uniting with and extending in the direction of the cooling belt or device and operating to deliver the can in a vertical position thereto without stopping the advancing or forward movement of the can. By this means the cans are made to pass continuously and without stopping through the machine, and are simultaneously turned from their inclined position into the requisite upright position for cooling while they are moving continuously forward, thus enabling the cans to be placed or rolled as close together in the machine as desired.

In the accompanying drawings, which form a part of this specification, I have, for convenience, shown my invention as applied to the form or construction of machine heretofore patented to Edwin Norton in Letters Patent of the United States No. 274,362, as it is to such machine that I have heretofore applied it, and as I believe this to be the best form of machine now known to me for practicing it. My invention may, however, be applied to other suitable forms of machines heretofore patented or known to those skilled in the art.

In said drawings Figure 1 is a side elevation of a device embodying my invention; Fig. 2 is an enlarged detail view of the can turning and motion reversing device detached from the machine. Fig. 3 is an end view of the same looking in the direction of the arrow, shown in Fig. 2. and Fig. 4 is a vertical cross section through the solder bath of the machine.

In the drawings like letters of reference indicate like parts throughout all the figures.

In said drawings A represents the frame of the machine, B the solder bath, C the inclined track along which the cans are rolled through or over the bath, D the cooling belt or carrier, E the chain or device for moving or rolling the cans, F an air pipe furnished with openings or nozzles $f$ to aid the cooling of the cans by an air blast as they are carried along by the carrier or belt D.

G is a looped and twisted track interposed between the soldering track C and the cooling belt D for the purpose of reversing or changing the direction of movement of the cans from that of the track C to that of the carrier D without stopping them, and for turning the cans from the inclined or rolling position that they have on the track C to a substantially vertical position which they occupy in cooling on the carrier D. The upper branch or limb G' of this looped and twisted track G unites with or forms a continuation of the soldering track C, while its lower limb or branch $G^2$ unites with and extends in the direction of the cooling belt or carrier D. This twisted and looped track G may be made of any suitable construction, but I preferably construct it out of six wires or small rods $g\ g\ g'\ g'$ and $g^2\ g^3$ suitably curved or bent, and united together by bands $g^4$ and connected to a suitable frame or support $G^3$.

It will be observed that the curved wires or rods $g'$, which form what may be termed the bottom of the upper limb or branch of the track G, and upon which the cans roll directly from the track C constitute one vertical side of the track at the lower limb or branch thereof; and that the two curved wires or rods $g$ which form the curved end wall of the track G at the looped or bent portion thereof constitute the opposite vertical side of the track at the lower limb or branch $G^2$ thereof where the cans are delivered onto the cooling belt; and that the two wires $g^2$ and $g^3$ which form the sides of the track G at the upper portion thereof, serve as its top and bottom at the lower limb or branch $G^2$ thereof where the cans are delivered onto the cooling belt D. It will be observed therefore that each of the four sides (top, bottom and two sides) of the track are thus given in reality approximately a one-quarter twist; that is to say that which was the top or bottom at one branch or limb of the looped and twisted track G, becomes the side at the other branch or limb thereof; and that which was the side at one branch becomes the top or bottom at the other branch. Where the cooling belt D is arranged directly under and parallel to the soldering track C, the two branches or limbs of the looped and twisted track will of course extend in directly opposite directions. Where the cooling belt or carrier is differently arranged in respect to the soldering track corresponding modifications will of course be made in the direction of the two limbs or branches of what I have termed my twisted and looped track. And by the use of the word "loop" or "looped" in the specification and claims I do not necessarily mean that the two branches of the track G extend in opposite directions, as shown in the drawings.

In operation the cans are rolled or propelled along the track C by the chain E, or other suitable means, and thus delivered to the twisted and curved or looped track G, down or through which the cans continue to roll by reason of their momentum or the motion which they already have, and by reason of the downwardly inclined path which the cans have while passing through this curved and twisted track; and as the cans roll down and through this track G they are simultaneously guided and turned into an approximately vertical position by reason of the spiral twist of the bottom, top and sides of the track G, and the cans issue thence onto the cooling belt D with approximately the same speed or forward movement that the belt D itself has. The curved wire or rod $g^2$ which forms the bottom of the track G at the lower limb or branch $G^2$ thereof, is preferably made shorter than the curved rods which form the sides and top of the track at this part thereof, so that the can after being deposited upon the belt D may be steadied or guided for a short distance by the extended or longer rods $g$, $g'$ and $g^3$.

It will be observed that the plane of the soldering track C is at an angle, in fact nearly a right angle, to the plane of the cooling device or carrier D, or rather that the plane of the axis of the cans while being conveyed along the soldering track C is nearly at a right angle to the plane of the axis of the cans while moving on the cooling device D.

The device G, which connects the soldering track and the cooling belt or carrier, may be considered as consisting in fact of a curved and spirally twisted way, passage or path for the can to pass through and along; and the walls of this passage support the can in all the varying positions that it assumes in turning from the inclined position of the track C to the upright position in which it is cooled.

In the use of the word "vertical" or "upright" I mean to be understood as indicating a position sufficiently near the upright or vertical to be practicable to the proper and sufficient cooling of the can.

I claim—

1. In a soldering machine, the combination with a soldering track and a cooling belt or carrier below said track and extending parallel thereto, and means for propelling said cooling belt or carrier in the opposite direction to that of the cans on said soldering track of a curved or looped and spirally twisted track, having one branch, limb or end thereof uniting with and forming a continuation of the soldering track so as to receive the cans therefrom, and its other branch, limb or end uniting with or extending in the direction of the cooling belt or carrier, and operating to deliver the cans thereto in a vertical position without stopping the continuous forward or advancing movement of the cans, substantially as specified.

2. The combination with inclined soldering track C and cooling belt or carrier D, of a curved or looped and twisted track G uniting said soldering track and cooling belt or carrier by a curved and twisted path, so that the cans may pass continuously and uninterruptedly along the same, substantially as specified.

3. In a soldering machine, the combination with an inclined soldering track C, of a cooling belt or carrier D arranged below the soldering track and substantially parallel thereto, of a curved or looped and twisted connecting track G down and along which the cans may roll continuously from said track C and by which they are turned into a vertical position and delivered to said cooling belt or carrier and while the cans are under motion and in a direction substantially the same as that of said carrier, substantially as specified.

4. In a soldering machine, the combination with an inclined soldering track C, of a cooling belt or carrier D arranged below the soldering track and substantially parallel thereto, and a curved or looped and twisted connecting track G down and along which the cans may roll continuously from said track C and by which they are turned into a vertical position and delivered to said cooling belt or carrier and while the cans are under motion and in a direction substantially the same as that of said carrier, said curved or looped and twisted connecting track G consisting of a number of curved rods, substantially as shown and described.

5. In a soldering machine, the combination with an inclined soldering track C, of a cooling belt or carrier D arranged below the soldering track and substantially parallel thereto, of a curved or looped and twisted connecting track G down and along which the cans may roll continuously from said track C and by which they are turned into a vertical position and delivered to said cooling belt or carrier and while the cans are under motion and in a direction substantially the same as that of said carrier, the bottom of said track G at the lower limb or branch thereof being shorter than the sides thereof, substantially as specified.

6. The combination with a soldering track C of a cooling belt or carrier D below the same, and a curved or looped and spirally twisted connecting device for delivering the cans from said track C to said carrier D and turning the same into a vertical position without stopping the forward movement or momentum of the cans, substantially as specified.

7. The combination with a soldering track C along which the cans move in one direction, of a cooling belt or carrier D along which the cans move in the opposite direction and while held in a vertical position, of a continuously curved or looped and spirally twisted connecting device between said soldering track and cooling carrier, whereby the motion of the cans is reversed in direction without stopping the same and the cans turned into a vertical position as required, substantially as specified.

ANDREW WILLIAM LIVINGSTON.

Witnesses:
WM. SWALLOW,
LINCOLN SONNTAG.